Nov. 11, 1930.    G. REIBER    1,781,411
AUTOMATIC PASTRY BAKING MACHINE
Filed Aug. 27, 1929    4 Sheets-Sheet 4

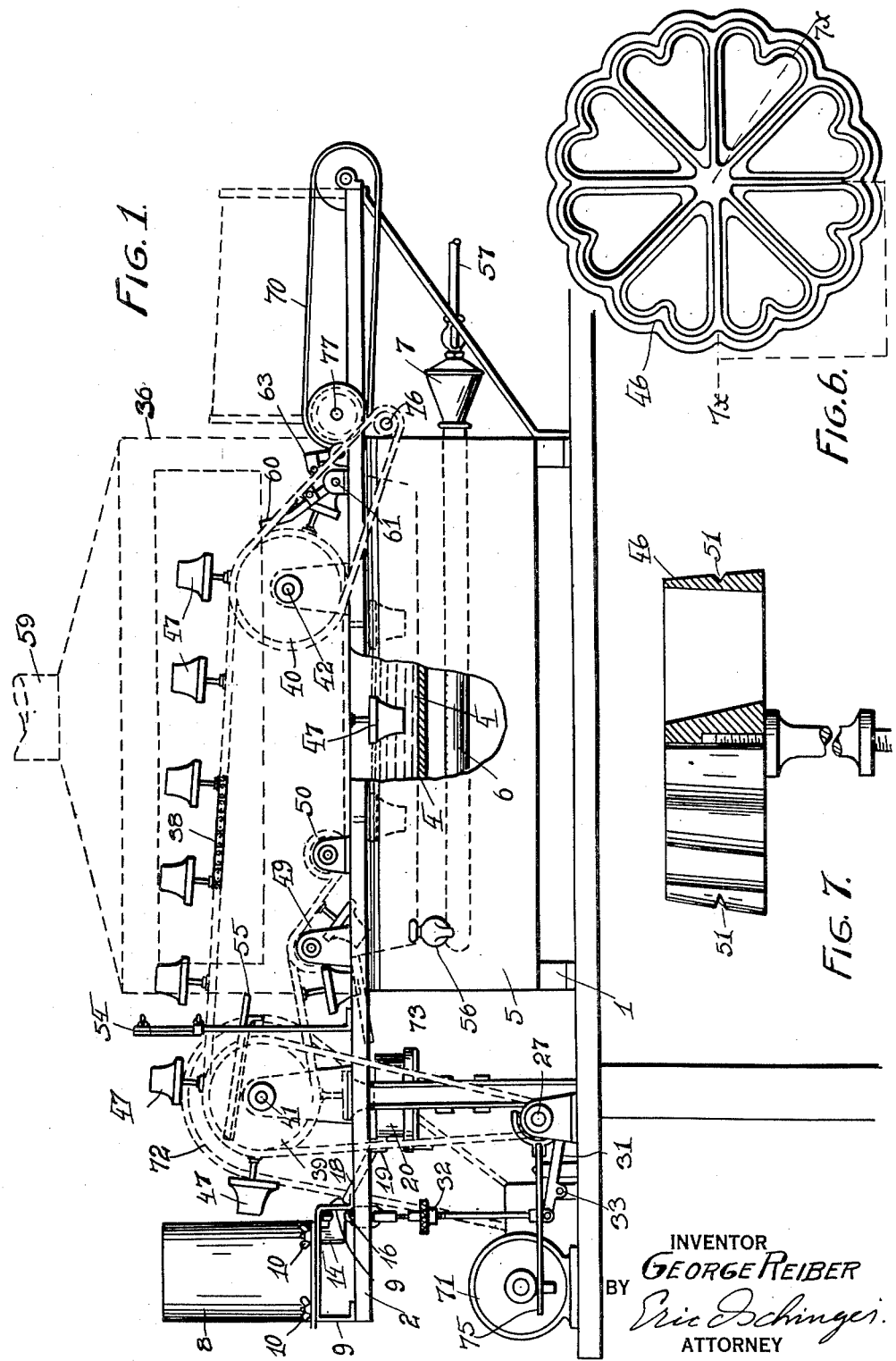

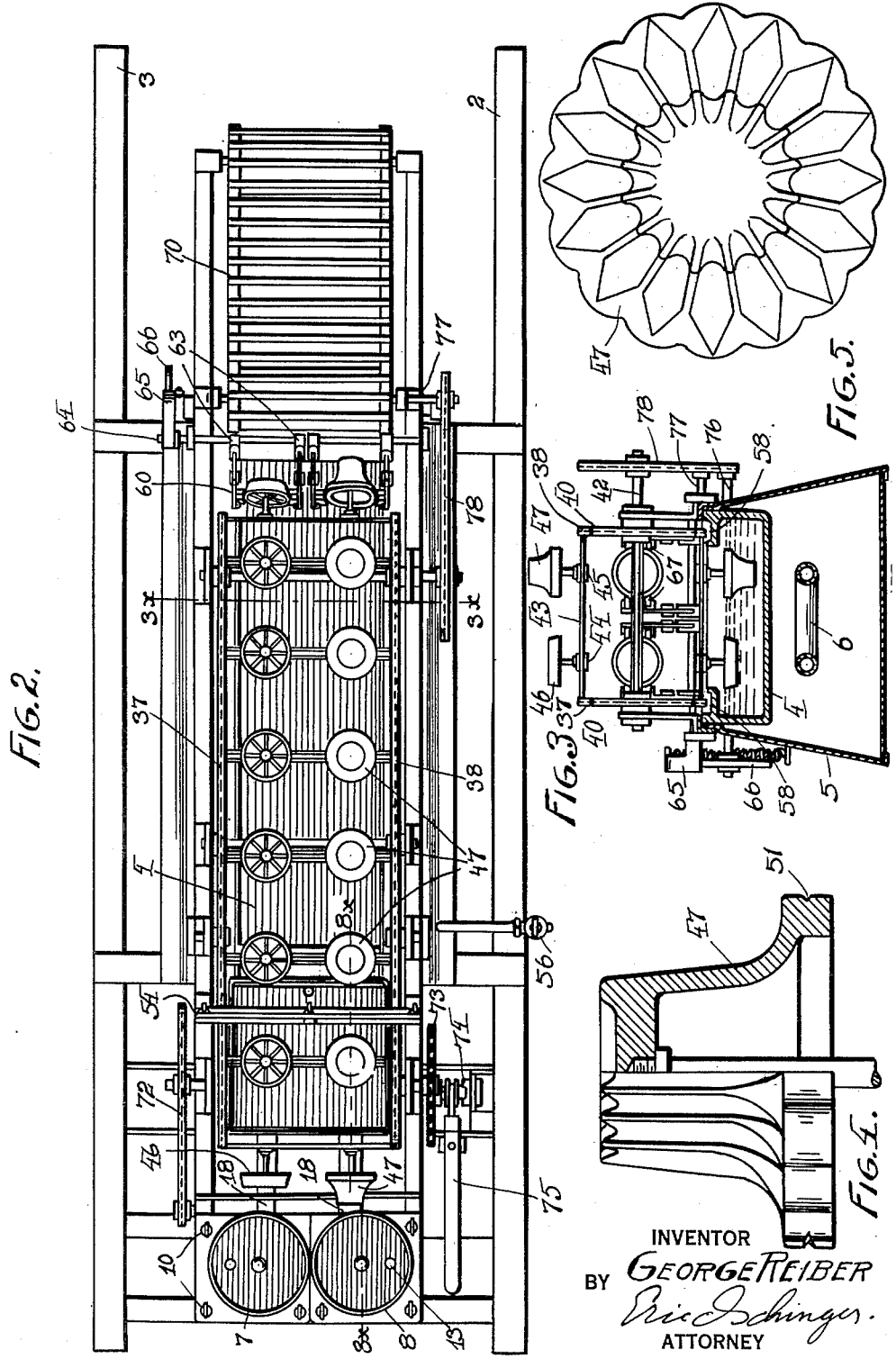

INVENTOR
GEORGE REIBER
BY
ATTORNEY

Patented Nov. 11, 1930

1,781,411

UNITED STATES PATENT OFFICE

GEORGE REIBER, OF ROCHESTER, NEW YORK

AUTOMATIC PASTRY BAKING MACHINE

Application filed August 27, 1929. Serial No. 388,844.

This invention relates to automatic baking machines and has for its various objects:

To provide a machine with which large quantities of so called pastry shells, rosettes and certain types of waffles may be baked at a high rate of speed.

To provide a machine with which thin batter may be handled and baked into various forms of pastry shells, rosettes, etc.

To provide a machine in which the batter is automatically fed from a supply tank to auxiliary tanks and thence to the baking forms in predetermined quantities.

To provide a machine in which the pastry is baked on preheated forms which are dipped into the batter to pick up just enough of the batter to form a thin shell or crust around the form.

To provide a machine in which the batter adhering to the outside of the form is baked thereon by the immersion of the form in hot oil, lard or other similar substance suitable for this baking process.

All these and other objects of this invention will be apparent from the drawings, the specification and the appended claims forming a part thereof.

In the accompanying drawings:

Figure 1 is a side elevation of the automatic pastry baking machine.

Figure 2 is a top plan view of the automatic pastry baking machine.

Figure 3 is a vertical sectional view of the automatic pastry baking machine, the section being taken on the line $3^x$—$3^x$ of Figure 2.

Figure 4 is an enlarged side elevation and partial sectional view of one of the forms on which the pastry is baked.

Figure 5 is a top plan view of the form illustrated in Figure 4.

Figure 6 is a top plan view of another of the forms used in the automatic pastry baking machine.

Figure 7 is a side elevation and partial sectional view of the form illustrated in Figure 6.

In the several figures of the drawings like reference numerals indicate like parts.

Figure 8:
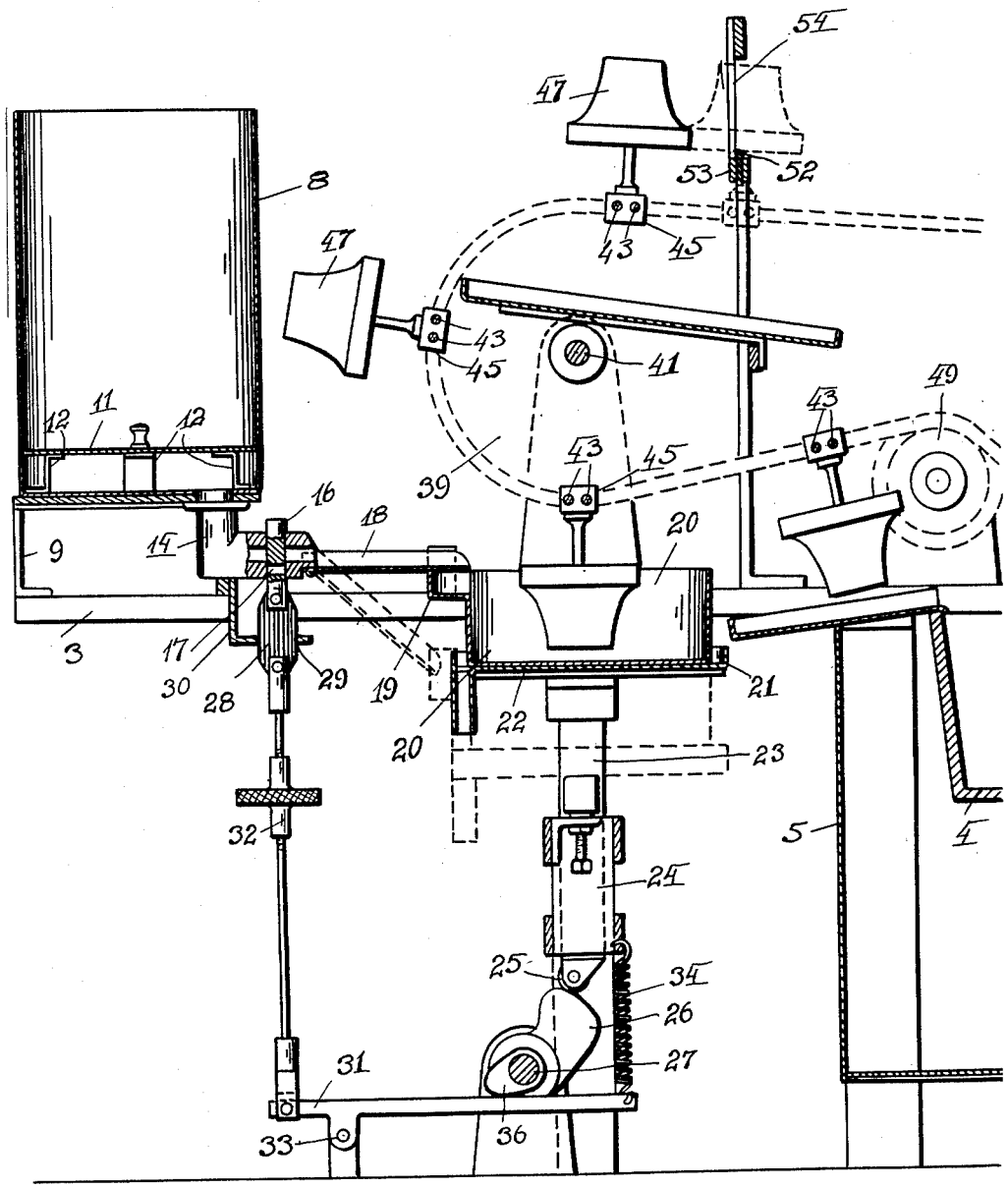
Figure 8 is an enlarged sectional view of a portion of the front end of the machine, the section being taken on the line $8^x$—$8^x$ of Figure 2.
Figure 9:
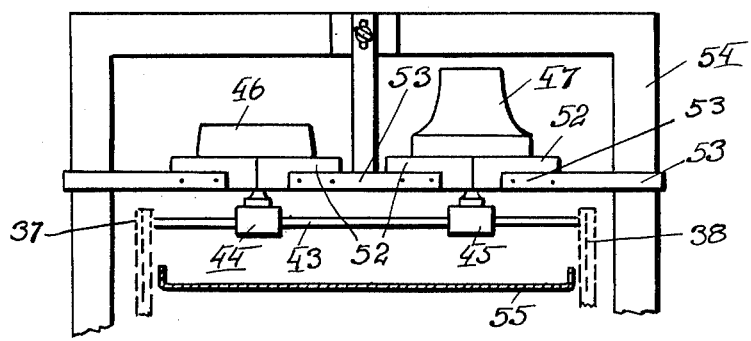
Figure 9 is a front elevation of the wipers for wiping off the excess oil picked up by the forms.

The automatic pastry baking machine forming the subject matter of this invention is adapted for baking so called pastry shells, rosettes and waffles of certain types which are baked with a thin batter which is made to adhere to the outer surface of a suitable form and is then immersed into a bath of heated oil or other suitable fat to complete the baking process.

As illustrated in the figures of the drawings the automatic pastry baking machine has a suitable frame 1 which supports a pair of horizontal members 2 and 3 at the top which extend the full length of the machine and provide the base on which the mechanism of the machine is mounted. Between the horizontal supporting members and at a point intermediate of the ends thereof is mounted the tank 4 which is surrounded on its sides, ends and bottom by the housing 5. The gas burner 6 is located within this housing underneath the tank 4 and furnishes the heat for heating the tank 4 and the oil or fat contained therein. The mechanism of the machine may be divided into three parts; the feeding mechanism which feeds the batter to the forms of the machine; the baking mechanism which takes forms with batter adhering to it and immerses them in a bath of hot oil or other suitable liquid fat and the discharge mechanism which strips the pastry from the forms after it has been baked on the forms.

*The feeding mechanism*

This mechanism comprises a pair of cylindrical tanks 7 and 8 which are supported on the pedestals 9 and are removably clamped thereto by means of the thumb nuts 10, 10. Each of the tanks has a removable false bottom which is spaced from the bottom proper of the tank by means of the lugs 12, 12. In the false bottom 11 is a small outlet opening 13 which leads into the space between the false bottom and the bottom proper. In the bottom proper is provided the outlet tube 14 which extends downwardly and then outwardly at right angles to the tank and has the valve stem 16 mounted therein near the outer end thereof. This valve stem passes thru the outlet tube at right angles thereto and is provided with a port opening 17 which is brought into and out of register with the inside duct of the outlet tube when the valve stem is moved up and down by a mechanism which will presently be described.

Mounted to swing on the outer end of the outlet tube is the trough 18 which bridges the gap between the outlet from the main tank and the spout 19 of the auxiliary tank 20 and keeps the two permanently connected with each other while the auxiliary tank is raised and lowered to make the forms 21 dip into the batter in the auxiliary tank as they pass over the auxiliary tank.

Both of the tanks 7 and 8 are thus provided with an auxiliary tank 20 which is connected with the outlet of the main tank by means of a trough 18. The auxiliary tanks 20 are surrounded by a continuous trough 21 which has a suitable outlet tube thru which any batter that has spilled over the top of the auxiliary tank into the trough is discharged. Both of the auxiliary tanks are mounted on the platform 22 which in turn is supported on the vertical supporting member 23. The guide member is mouned to slide up and down in the guide 24 and carries at the lower end the antifriction roller 25. This roller is adapted to roll over the periphery of the cam 26 which is mounted on the shaft 27 so that the roller 25 and with it the guide member 23 is raised and lowered on the rotation of the shaft. The cam 26 raises the guide member positively during part of its revolution and permits the guide member to drop back to its starting position during the remainder of the revolution. In this way both of the auxiliary tanks 20 are simultaneously raised and lowered to make the forms dip into these tanks.

To insure a constant supply of batter in the auxiliary tanks 20 an amount of batter equal to the amount taken out the auxiliary tank by one of the forms is intermittently fed from the main tanks into the auxiliary tanks. The intermittent flow of batter from the main tanks to the auxiliary tanks is controlled by the valve rod 16. This rod has a flat guide member 28 connected to the lower end of it which guide member is mounted to slide in the guide groove 29 provided in the stationary bracket 30. The guide slot and guide member hold the valve against turning so that on the up and down movement thereof the valve opening in the valve rod is always brought into and out of register with the duct in the outlet tube 14. The guide member 28 in turn is connected to the outer end of the lever 31 by means of the turn buckle connection 32. This connection is provided so that it may be lengthened or shortened in order to move the valve rod so that it feeds the correct amount of batter into the auxiliary tank. The lever 31 is pivoted at 33 and to the free end of it is attached a spring 34 which normally draws the lever against the perimeter of the cam 36. This cam is also mounted on the shaft 27 and its outline is such that on the rotation of the shaft the cam is depressed during a part of its revolution in order to raise the valve stem and open the valve to allow batter to flow from the main tank to the auxiliary tank. During the remainder of the revolution of the cam the lever is drawn back to its starting position by means of the spring 34 to close the valve and shut off the supply of batter to the auxiliary tank while one of the forms is immersed in the auxiliary tank by the elevation of the tank. In this way the valve and the auxiliary tanks are alternately operated to first feed batter into the tank and then allow the forms to pick up an equal amount of batter by raising the auxiliary tank to immerse a form in the batter so that the batter can adhere thereon.

*The baking mechanism*

This mechanism comprises a pair of endless roller chains 37 and 38 which travel over two pair of sprocket wheels 39, 39 and 40, 40. These sprocket wheels are mounted on the shafts 41 and 42 respectively which are mounted to rotate in suitable bearings supported on the horizontal members 2 and 3 of the frame of the machine. At suitable intervals the sprocket chains 37 and 38 have two parallel rods 43 suspended between them and on these rods are mounted the supporting blocks 44 and 45, each of which forms the supporting base for one of the forms 46 or 47. The supporting blocks have a threaded hole in the center to receive the threaded lower end of the stem 48 of one of the forms. In this way all of the forms are firmly anchored to the rods 43 and in turn to the sprocket chains so that on the movement of the chains the forms 46 and 47 are continuously moved in pairs from one of the sprocket wheels to the other and back again. The sprocket wheels are rotated to move the forms from right to left over the top of the sprocket wheels and from left to right over the bottom of the sprocket wheels. The forms thus project upwardly from the chain as they move toward the batter feeding and receiving mechanism and then project downwardly when moving away from this mechanism. In the downwardly projecting position the forms are immersed in a hot oil bath in the tank 4 and in order to move the forms into the tank to be immersed the chains 37 and 38 are made to travel over two sets of sprocket pinions 49 and 50; that is over the top of the sprocket pinions 49 and under the sprocket pinions 50. This raises the chains and then lowers them in order to permit the forms carried between to readily swing into the end of the tank. The forms are carried thru the tank and are held immersed in the hot oil bath so that by the time the forms emerge from the other end of the tank the batter has been baked on the forms and the resulting pastry is ready to be stripped off therefrom. The forms on their travel from right to left are thus dipped into the auxiliary tanks at the left hand end of the chain to pick up the batter which is then carried thru the hot oil bath during their travel to the right hand end of the chains for baking, after which the finished pastry is stripped off the forms as they emerge from the hot oil bath. The batter feeding mechanism is so timed that the auxiliary tanks rise and immerse the forms in the batter and withdraw again as the forms pass over the auxiliary tank with a slow but constant movement.

The forms 46 and 47 are of different design as illustrated in the figures. Of these form 46, illustrated in Figures 6 and 7, has the outline of a rosette and is narrow and the batter picked up thereby and baked thereon will have a corresponding outline when stripped therefrom. Form 47, illustrated in Figures 4 and 5, has the shape of an inverted cup with suitable ridges around the outside walls and the batter adhering thereto forms a cup shaped pastry after being baked on the form and stripped therefrom. In order to prevent the batter from dropping off the forms before it is fully baked thereon, suitable grooves 51, 51 are cut into the sides of the forms at diametrically opposite points thereon. The batter enters these grooves and forms ridges which hold the batter in place until it is fully baked and is stripped off from the form. In the operation of the machine the forms are always kept heated by the immersion of them in the hot oil bath and it is necessary even on the start of the machine to preheat the forms to the proper temperature before the forms are immersed in the batter. The heat of the forms on the immersion thereof bake the batter sufficiently to make it adhere thereto while the form moves away from the auxiliary batter tank and into the hot oil tank.

On the immersion of the forms into the tank some of the oil is picked up and carried around on the forms. This excess oil is wiped off from the forms before they are again immersed in the batter so as not to allow the oil to drip into the batter. For this purpose the wipers 52, 52 are provided which are made up of suitable flexible material and are mounted on cross bars 53, 53. The cross bars are adjustably mounted on the upright frame 54 near the left hand end of the chains so as to brush over the bottom of the forms and the supporting stems and wipe off any oil that has collected thereon. The oil that is wiped off drops into the drip pan from where it may be allowed to drain back into the tank 4.

The tank 4 is provided with a suitable drain 56 thru which the oil may be drained to empty the tank. The heat for heating the oil in the tank is supplied by the gas burner 6 which is located under the tank within the housing 5, the gas being fed from the pipe 57.

In order to prevent grease or oil from the chains 37 and 38 from entering the tank and mixing with the hot oil contained therein, a channel 58 is formed on each side of the tank at the top thereof and the chains move in this channel as they travel from one end to the other end thereof.

The top of the tank and the sections of the chains with their forms located above the tank are suitably covered with a cover 36 such as illustrated in section in Figure 1. This cover has an outlet 59 in the top thru which the smoke rising from the heated oil is drawn off and carried out of the room.

*The discharge mechanism*

Figures 10, 11:
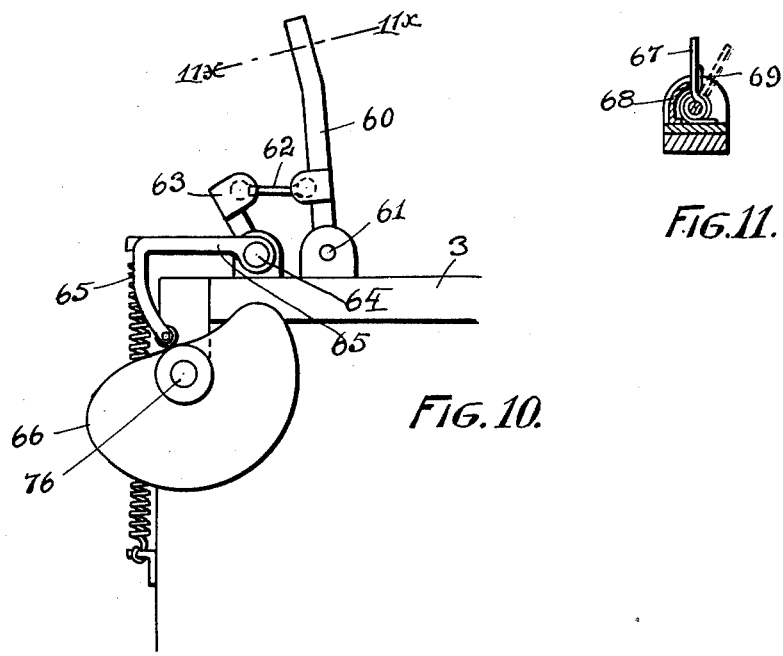
Figure 10 is a detail side elevation of the stripping mechanism for stripping the baked pastry shells from the forms.
Figure 11 is an enlarged horizontal sectional view of one of the stripping fingers.

This mechanism is located at the right hand end of the machine and serves to strip the pastry from the forms after it has been baked in the hot oil bath. The stripping mechanism consists of a pair of stripping fingers 60, 60 for each series of forms 46 and 47. These fingers are mounted to swing in suitable bearing blocks 61 and are connected with links 62 to the rocker arms 63, 63. The rocker arms are carried on the shaft 64 and are rocked thereby. The rocking motion is given to the arm 65 which is keyed to the end of the shaft and carries an antifriction roller 66 which is adapted to roll over the perimeter of the cam 66. The outline of the cam is such that it rocks the arm 65 in proper timing with the movement of the chains 37 and 38 so that when a pair of the forms 46 and 47 have emerged from the oil bath the stripping fingers are rocked from the position illustrated in Figure 1 to that illustrated in Figure 10 to strip the baked pastry from these forms. Each of the stripping fingers is provided with spring pressed strippers 67 which project to one side of the fingers and partially encircle each side of the forms as they move past them. The strippers are normally held against the stops 68 by their springs 69 and project at right angles from the fingers on which they are mounted. As the strippers move past the forms they engage the edge of the pastry that is baked thereon and force the pastry off the forms on their movement past the forms. In order to prevent the strippers from breaking off should they engage the end of the form, the strippers are allowed to yield in one direction as illustrated in dotted lines in Figure 11. After being stripped off the forms the pastry drops onto the conveyor belt 70 by which the pastry is carried away from the machine and fed to a suitable container.

The motive power for driving the different mechanisms above described is furnished by the electric motor 71. This motor drives the shaft 41 of the baking mechanism by means of a suitable reduction gearing including the chain drive 72. From the shaft 41 is driven the shaft of the feeding mechanism 27 by means of the chain drive 73. On the shaft 27 is provided the clutch 74 which is operated by the handle 75 and the clutch is so arranged and designed that it cannot be operated to drive or stop the feeding mechanism unless the forms of the baking mechanism are in a predetermined position in which their movement cannot interfere with the movement of the auxiliary tanks 20.

From the shaft 41 the power is transmitted thru the chains 37 and 38 to the shaft 42 and from the shaft 42 the power is transmitted to the shafts 76 and 77 by means of the chain drive 78. Shaft 76 carries the cam 66 and operates the stripping fingers while shaft 77 carries one of the rollers of the conveyor 70, and thus drives the conveyor.

I claim:

1. An automatic pastry baking machine having a series of baking forms, a batter receptacle, means for suspending in said forms in the batter of said batter receptacle and cover said forms with the batter, means for immersing said baking forms with the batter in a hot oil bath to bake the batter onto said forms and means for stripping the baked pastry from said forms after emerging from the hot oil bath.

2. An automatic pastry baking machine, a batter receptacle, a series of baking forms, means for preheating said baking forms, means for suspending said baking forms in said receptacle to have a predetermined amount of batter adhere to said forms, means for baking the batter on said baking forms and means for stripping the baked pastry from said baking forms.

3. An automatic pastry baking machine having a series of baking forms, means for continuously moving said baking forms, means for immersing said baking forms in batter to cover said forms with batter during part of their travel, means for baking the batter onto said forms during another part of their travel and means for stripping the baked pastry from the forms during another part of their travel.

4. An automatic pastry baking machine having a series of moving baking forms, a fixed batter tank, means for automatically feeding predetermined quantities of batter from said fixed batter tank, an auxiliary batter tank adapted to receive the predetermined quantities of batter from said fixed batter tank, means for intermittently moving said batter tank toward said moving baking forms to consecutively immerse said forms in the batter in said auxiliary tank, means for baking the batter on said baking forms and means for stripping the baked pastry from said baking forms.

5. An automatic pastry baking machine having a series of moving baking forms, a fixed batter tank, means for automatically feeding predetermined quantities of batter from said fixed batter tank, an auxiliary batter tank adapted to receive the predetermined quantities of batter from said fixed batter tank, means for intermittently moving said batter tank toward said moving baking forms to consecutively immerse said forms in the batter in said auxiliary tank, means for immersing the batter coated baking forms in a hot oil bath to bake the batter to said baking forms and means for stripping the baked pastry from said forms.

6. An automatic pastry baking machine having a series of moving baking forms, a fixed batter tank, a compartment formed in the bottom of said tank and having an inlet from said batter tank, an outlet from said compartment, a valve controlling the flow of batter from said compartment, an auxiliary batter tank and means for connecting said auxiliary batter tank with said compartment of fixed batter tank to receive predetermined quantities of batter from said fixed batter tank, means for immersing said baking forms in the batter in said auxiliary batter tank, and means for baking the batter on said baking forms.

7. An automatic pastry baking machine having a fixed batter tank and a movable batter tank, means for connecting said fixed tank with said movable tank, means for controlling the flow of batter from said fixed tank to said movable tank, a baking form located above said auxiliary tank, said auxiliary tank being moved toward and away from said baking form to dip said baking form in the batter contained therein and leave said baking form covered with a coat of batter on the withdrawal of the auxiliary tank from said baking form and means for baking the batter on said baking form.

8. In an automatic pastry baking machine the combination of a series of baking forms, each having a conical body with parallel axial ridges on the outside of the body, an outwardly flaring flange at one end of said conical body, a depression in the other end of said conical body, and a central stem supporting said conical body.

9. In an automatic pastry baking machine the combination of a baking form having a conical body with a depression in one end thereof, an outwardly flaring flange at the other end of said conical body, and channels leading from said depression over the outside of said conical body to drain the oil that may collect in said depression.

10. In an automatic pastry baking machine the combination of a baking form having a conical body with a depression in one end thereof, an outwardly flaring flange at the other end of said conical body, and channels leading from said depression over the outside of said conical body to drain the oil that may collect in said depression, a circumferential locking groove in the outside of said baking form.

11. In an automatic pastry baking machine the combination of a pair of endless chains, baking forms carried by said chains, a tank adapted to contain a hot oil bath, channels formed at the top of said tank, one on each side thereof, to have said chain move therein from one end thereof to the other with the forms located between said channels and held submerged in the hot oil bath in said tank.

12. In an automatic pastry baking machine the combination of a series of moving baking forms, means for covering said baking forms with batter, means for baking the batter on said baking forms, a stripping device comprising a pair of finger spring pressed stripping means projecting from said fingers against the sides of said forms and means for intermittently rocking said fingers to brush said stripping members past the outside of each of said forms at a predetermined position thereof to strip the baked pastry from said form.

13. In an automatic pastry baking machine the combination of a series of continuously moving baking forms, a tank containing a bath of hot oil, means for moving said forms thru said hot oil bath, a pair of wiping members adapted to engage the under side of said forms after emerging from said hot oil bath and wipe off the surplus oil adhering to said forms.

14. In an automatic pastry baking machine the combination of a series of moving baking forms, a tank containing oil, means for heating said oil, a tank containing batter adapted to move toward and away from each of said baking forms at a predetermined position of each of said baking forms to immerse each form in the batter in said tank and cover the outside of said baking form with the batter, a dripping pan adapted to catch the drippings from the batter on the movement of the baking form away from said tank, means for guiding said batter covered baking forms into the oil tank to immerse the batter in the hot oil contained therein and bake the batter onto the forms, means for stripping the baked pastry from the forms after emerging from the oil tank and a wiper adapted to engage the lower edges of said forms after having the pastry stripped from it to wipe off the excess oil picked up from the oil tank in their movement thru the hot oil.

15. In an automatic pastry baking machine the combination of a pair of endless chains, a series of rods supported between said chains at predetermined distances from one another, a supporting block mounted on each pair of said rods, a stem mounted in said supporting block, a baking form supported by said stem and means for laterally adjusting said baking forms on said rods.

GEORGE REIBER.